United States Patent [19]
Nihonmatsu

[11] Patent Number: 6,156,687
[45] Date of Patent: Dec. 5, 2000

[54] JIG FOR USE IN FIRING OF FERRITE-MADE PRODUCT

[75] Inventor: Hiroaki Nihonmatsu, Tajimi, Japan

[73] Assignees: NGK Insulators, Ltd.; NGK Adrec Co., Ltd., both of Japan

[21] Appl. No.: 09/213,255

[22] Filed: Dec. 17, 1998

[30] Foreign Application Priority Data

Aug. 21, 1997 [JP] Japan .................................. 9-224834

[51] Int. Cl.$^7$ .................................................. C04B 35/443
[52] U.S. Cl. ................................................. 501/120; 501/121
[58] Field of Search ..................................... 501/120, 121

[56] References Cited

U.S. PATENT DOCUMENTS

| | | | |
|---|---|---|---|
| 3,577,247 | 5/1971 | McKenna | 501/120 |
| 4,729,974 | 3/1988 | Nazirizadeh et al. | 501/120 |
| 4,780,434 | 10/1988 | Watanabe et al. | 501/120 |
| 5,135,896 | 8/1992 | Vezza | 501/120 |
| 5,283,215 | 2/1994 | Hosokawa et al. | 501/120 |
| 5,316,571 | 5/1994 | Yamamura et al. | 501/120 |
| 5,614,450 | 3/1997 | Britt | 501/120 |

*Primary Examiner*—Paul Marcantoni
*Attorney, Agent, or Firm*—Parkhurst & Wendel, L.L.P.

[57] ABSTRACT

There is provided a jig for use in firing of ferrite-made member (e.g. deflection yoke). The jig contains $MgO \cdot Al_2O_3$ spinnel as the main component. In the jig, the molar ratio of total MgO and total $Al_2O_3$ is 25:75 to 75:25; and RO, which is at least one kind of oxide selected from the group consisting of ZnO, CuO, MnO, NiO, CaO, SrO, BaO, PbO and CdO, is contained in an amount of 0 to 25 mole % per 100 mole % of the sum of total MgO and total $Al_2O_3$. This jig is unreactive to a material (e.g. deflection yoke) to be fired and consequently gives rise to no dimensional change of the material to be fired.

9 Claims, 3 Drawing Sheets

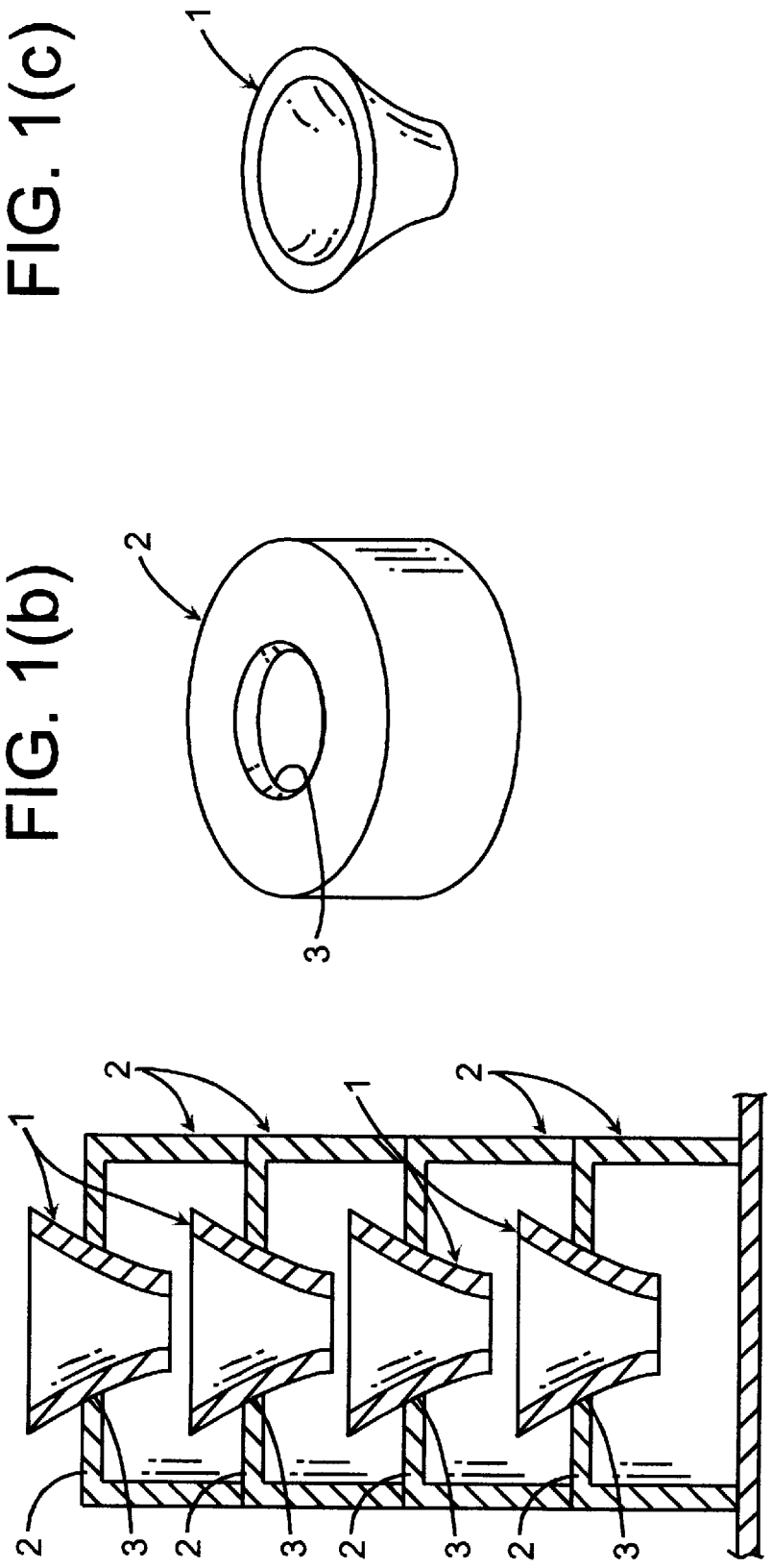

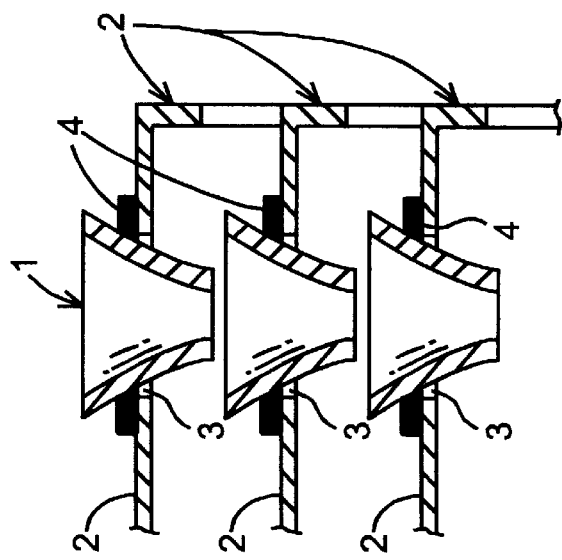
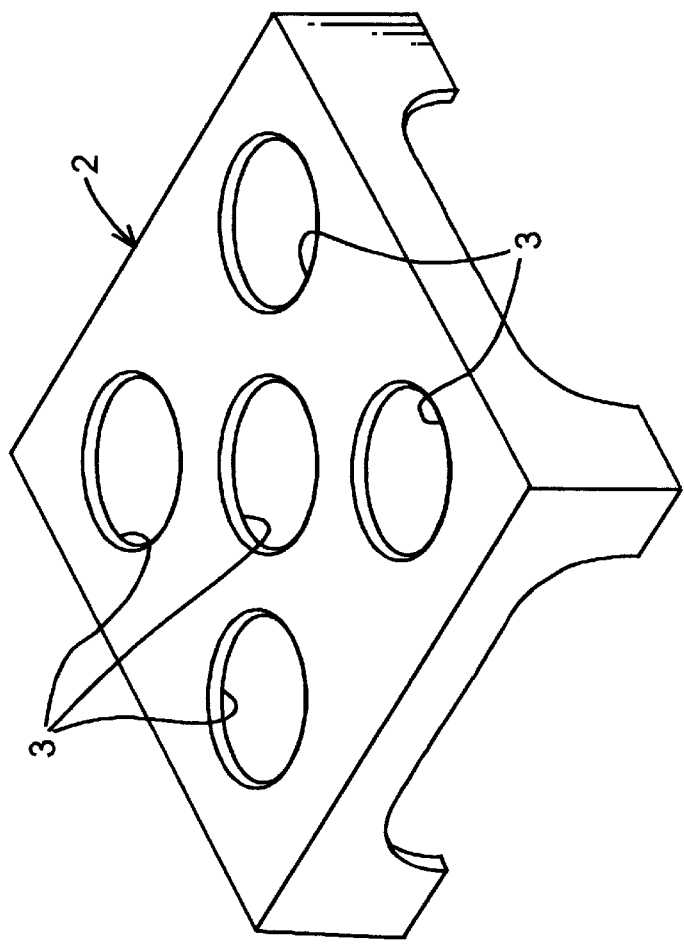

6,156,687

JIG FOR USE IN FIRING OF FERRITE-MADE PRODUCT

BACKGROUND OF THE INVENTION

1. Field of the Invention

The present invention relates to a jig for use in firing of ferrite-made product. More particularly, the present invention relates to a jig which enables firing of ferrite-made product (e.g. deflection yoke) with high dimensional accuracy.

2. Description of Related Art

Ferrite-made electronic parts such as deflection yoke and the like have conventionally been subjected to a firing treatment by inserting a deflection yoke 1 (shown in FIG. 1(c)) to be fired, into the hole 3 of a jig 2 (shown in FIG. 1(b)), then ordinarily piling up a plurality of such jigs as shown in FIG. 1(a) and placing the piled material in a firing furnace, or by inserting deflection yokes 1 into a plurality of holes 3 of a jig 2 (shown in FIG. 2(a)) with each ring 4 placed between each yoke 1 and each hole 3, piling up a plurality of such jigs as shown in FIG. 2(b), and placing the piled material in a firing furnace. The jig 2 and ring 4 used above have generally been made of mullite and alumina, respectively.

The mullite-made jig and the alumina-made ring have been found to have the following drawbacks.

(1) A deflection yoke to be fired is made of ferrite containing MnO, ZnO and, as the main component, $Fe_2O_3$. The MnO and ZnO components in ferrite react with $Al_2O_3$ in mullite ($Al_2O_3$—$SiO_2$) of jig to form a spinnel phase. Formation of the spinnel phase gives rise to volume expansion and consequently dimensional error.

Moreover, a mullite-made jig is porous, and further reacts with some components of deflection yoke and tends to form a vitreous layer; as a result, the deflection yoke after firing has dimensional changes (dimensional errors) in inner diameter, etc. and has no sufficient roundness.

(2) When an alumina-made ring is used, it reacts with some components of deflection yoke to be fired, to form a spinnel phase; as a result, the deflection yoke after firing has larger dimensions due to expansion, the inner and outer surfaces have strains, and the deflection yoke has no sufficient roughness. Furthermore, when the alumina-made ring is used by being fitted into the dent of a jig, the dimensional expansion of ring may bring about the destruction of jig.

Moreover, since the above reactions take place at the interface between jig and material to be fired or between ring and material to be fired, the material to be fired gives rise to component change at the interface, incurring deterioration in properties (e.g. strength) of material after firing.

SUMMARY OF THE INVENTION

In view of the above-mentioned problems of the prior art, the present invention is intended to provide a jig for use in firing of material such as deflection yoke or the like, which jig is unreactive to the material and consequently gives rise to no dimensional change of the material.

According to the present invention, there is provided a jig for use in firing of ferrite-made member, which contains $MgO.Al_2O_3$ spinnel as the main component.

In the jig of the present invention, the molar ratio of total MgO and total $Al_2O_3$ is preferably 25:75 to 75:25 and the content of $MgO.Al_2O_3$ spinnel is preferably 50% by weight or more.

Further in the present jig, RO, which is at least one kind of oxide selected from the group consisting of ZnO, CuO, MnO, NiO, CaO, SrO, BaO, PbO and CdO, may be contained in an amount of 0 to 25 mole % per 100 mole % of the sum of total MgO and total $Al_2O_3$.

In the present invention, "the molar ratio of total MgO and total $Al_2O_3$" in jig refers to the ratio of (1) the total moles of MgO in $MgO.Al_2O_3$ spinnel ($MgAl_2O_4$) and unreacted MgO (if present) and (2) the total moles of $Al_2O_3$ in $MgO.Al_2O_3$ spinnel and unreacted $Al_2O_3$ (if present).

In the present invention, "100 mole % of the sum of total MgO and total $Al_2O_3$" in jig refers to the total moles of MgO in $MgO.Al_2O_3$ spinnel, $Al_2O_3$ in $MgO.Al_2O_3$ spinnel, unreacted MgO and unreacted $Al_2O_3$, expressed as 100 mole %.

In the present invention, the material to be fired is preferably deflection yoke.

As mentioned above, the jig of the present invention is used in firing of ferrite-made member and contains $MgO.Al_2O_3$ spinnel as the main component in an amount of preferably 50% by weight or more.

Being composed of the above spinnel, the present jig, when used in firing of ferrite-made material such as deflection yoke or the like, is unreactive to the material and gives rise to no deformation of the material.

BRIEF DESCRIPTION OF THE DRAWINGS

FIGS. 1(a)(b)(c) show an example of the jig of the present invention and a deflection yoke to be fired. FIG. 1(a) is a sectional view showing a state in which a plurality of jigs each holding a deflection yoke are piled up; FIG. 1(b) is a perspective view of an example of the present jig which is a perforated sagger; and FIG. 1(c) is a perspective view of a deflection yoke.

FIGS. 2(a)(b) show another example of the jig of the present invention. FIG. 2(a) is a perspective view showing an example of the present jig which is a jig having a plurality of holes; and FIG. 2(b) is a sectional view showing a state in which a plurality of jigs each holding a plurality of deflection yokes are piled up.

DETAILED DESCRIPTION OF THE INVENTION

Figure 3:
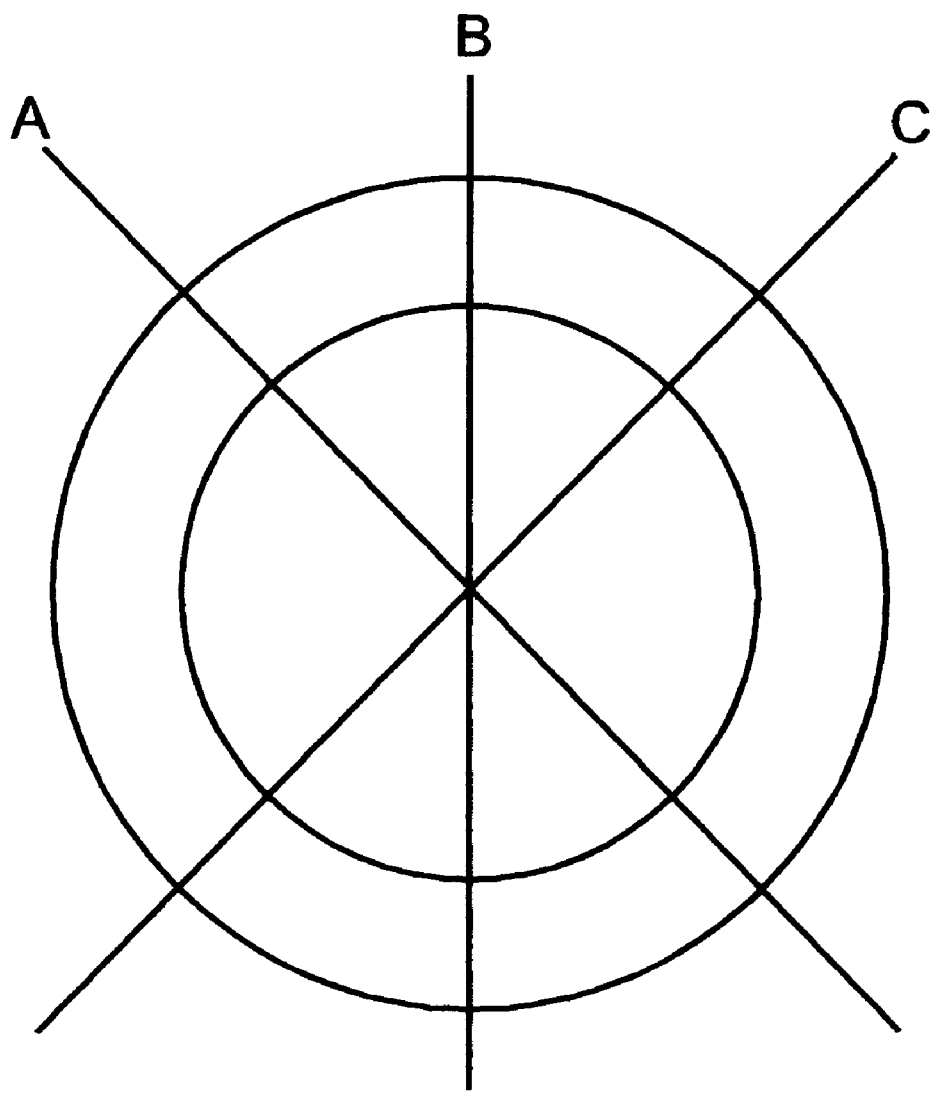
FIG. 3 is a drawing showing a method for measurement of the roundness of deflection yoke.

The present invention is hereinafter described in detail.

The jig of the present invention is used in firing of a material to be fired, and generally comprises a perforated sagger (which is called a pot sagger) and a ring to be provided along the hole of the perforated sagger to support the material to be fired.

In the present jig, $MgO.Al_2O_3$ spinnel is used as the main component. Spinnel has a crystal structure of $MgAl_2O_4$ and is unreactive to MnO or ZnO both contained in ferrite materials (e.g. deflection yoke), forming no glassy phase or giving rise to no expansion of ferrite. That is, the spinnel having a $MgAl_2O_4$ crystal structure is not a mere mixture of MgO and $Al_2O_3$ and therefore is unreactive to MnO or ZnO.

The present jig containing $MgO.Al_2O_3$ spinnel as the main component can be produced by heating a raw material (s) (MgO and $Al_2O_3$, or a material for $MgO.Al_2O_3$ spinnel, or an appropriate mixture thereof) in an oxidizing atmosphere at a temperature of 1,250° C. or higher, preferably 1,400° C. or higher for a given length of time.

In the above heating, the raw material(s) is (are) not completely converted to a $MgAl_2O_4$ crystal structure of spinnel depending upon the heating temperature and the heating time. However, it is desired that in the jig produced, s-pinnel is contained in an amount of 50% by weight or more, preferably 75% by weight or more because such a jig has very low reactivity to a material to be fired with the jig.

Also in the present jig, the molar ratio of total MgO and total $Al_2O_3$ is preferably 25:75 to 75:25. When MgO is present in an amount of larger than equal moles relative to $Al_2O_3$, there appear a combination wherein $MgAl_2O_4$ crystals and excess MgO are present and a combination wherein $MgAl_2O_4$ crystals, unreacted MgO and unreacted $Al_2O_3$ are present. When $Al_2O_3$ is present in an amount of larger than equal moles relative to MgO, there appear a combination wherein $MgAl_2O_4$ crystals and excess $Al_2O_3$ are present and a combination wherein $MgAl_2O_4$ crystals, unreacted MgO and unreacted $Al_2O_3$ are present.

When the total MgO in jig is less than 25 mole %, the total $Al_2O_3$ in jig is more than 75 mole %; as a result, a reaction takes place between $Al_2O_3$ in jig and MnO or ZnO in ferrite material to be fired and the above-mentioned dimensional error is bigger. Meanwhile, when the total MgO in jig is more than 75 mole %, the resulting jig has a thermal expansion (%) higher than specified, easily giving rise to destruction caused by spalling. The molar ratio of MgO and $Al_2O_3$ in present jig is more preferably 40:60 to 60:40.

In the present jig, RO, which is at least one kind of oxide selected from the group consisting of ZnO, CuO, MnO, NiO, CaO, SrO, BaO, PbO and CdO, may be contained in an amount of 0 to 25 mole % per 100 mole % of the sum of total MgO and total $Al_2O_3$.

By the presence of the above RO in the present jig, the ferrite material fired on the jig has improved properties depending upon the composition of the ferrite material. However, the presence of the RO in an amount of more than 25 mole % is not preferred because the ferrite material fired may be deteriorated in properties (e.g. strength) depending upon the composition of the ferrite material.

The jig of the present invention is used in firing of ferrite-made products or members (e.g. deflection yoke). Deflection yoke is constituted by ferrite which contains MnO, ZnO and, as the main component, $Fe_2O_3$. Yoke must have a minimum dimensional error in order to exhibit its intended performance. The jig of the present invention is constituted by $MgO.Al_2O_3$ spinel, as mentioned previously; therefore, when deflection yoke is fired with the present jig, there occurs no reaction between jig and the MnO and ZnO contained in the ferrite constituting the deflection yoke, and there arises neither formation of glassy phase nor expansion of ferrite and there is no deformation of the material to be fired.

The present invention is described in more detail below by way of Examples. However, the present invention is in no way restricted to these Examples.
(Test Methods)

The jigs produced and the materials fired with the jigs were tested as follows.

1. Reactivity

The produced ring-shaped jig was cut into a sample of 5 mm×5 mm×50 mm. The sample was buried in a ferrite powder and passed through a furnace ten times under the thermal load of 1,350° C. and 5 hours. The dimensional change (%) of the sample before and after passing through the furnace was measured.

2. Change of Roundness

The produced ring-shaped jig was coated with a ferrite slurry at the inner surface and passed through a furnace ten times under the thermal load of 1,350° C. and 5 hours. The change (mm) of roundness of inner surface before and after the jig was passed through the furnace, was measured.

3. Measurement of Roundness

As shown in FIG. 3, the inner diameter of ring-shaped jig was measured at three points A, B and C by the use of a slide calipers. The difference between the maximum diameter and the minimum diameter was taken as the roundness of inner surface of the jig.

4. Spalling Resistance

The same sample as used in 1. reactivity was prepared by cutting. An operation of taking out the sample from a 1,000° C. state to room temperature was repeated ten times. The spalling resistance of the sample was evaluated by the difference of strength of the sample before and after the operation, based on the following yardstick.

⊚: excellent

○: good

Δ: slightly bad

×: bad

5. Strength

A ferrite sample of 60 mm×6 mm×6 mm was fired on the produced ring-shaped jig at 1,350° C. for 1 hour, after which the ferrite sample was measured for three-point bending strength.

6. Spinnel Amount CuKα X-ray diffractometry was used. The values of alumina 43.35°, MgO 43.05° and spinnel 36.85° were taken as A, B and C, respectively. A calibration curve was prepared using a mixed powder containing individual minerals at given proportions. Thus, spinnel amount was measured.

EXAMPLES 1–7 AND COMPARATIVE EXAMPLES 1–4

A raw material spinnel powder, a raw material alumina powder and a raw material magnesia powder each having an average particle diameter of 6 μm were weighed so as to give a molar ratio shown in Table 1 or 2 and mixed. The mixed powder was mixed with 0.3% by weight of a polyvinyl alcohol (PVA) as a binder. The resulting mixture was subjected to granulation by the use of a spray dryer.

The granulated powder was filled in a mold of outer diameter=100 mm and inner diameter=70 mm so that a thickness of 5 mm was obtained, and subjected to molding at a pressure of 500 kg/cm² by the use of an oil hydraulic press. The molded product was dried at 100° C. for 8 hours and then fired at a temperature shown in Table 1, in an electric furnace, to produce a ring-shaped jig sample. The ring-shaped jig sample was measured for reactivity, roundness and spalling resistance. The results are shown in Tables 1 and 2.

TABLE 1

|  |  | Example | | | | | | | | | | |
|---|---|---|---|---|---|---|---|---|---|---|---|---|
|  |  | 1 | 1' | 2 | 3 | 3' | 4 | 5 | 5' | 6 | 7 | 7' |
| Raw materials (wt %) | Alumina |  | 45 |  |  | 71.7 |  |  | 71.7 | 15 | 42 | 88 |
|  | Magnesia | 22 | 55 | 7 |  | 28.3 |  |  | 28.3 |  |  | 12 |
|  | Spinnel | 78 |  | 93 | 100 |  | 100 | 100 |  | 85 | 58 |  |
| $Al_2O_3$ (mol %) |  | 25 | 25 | 40 | 50 | 50 | 50 | 50 | 50 | 60 | 75 | 75 |

TABLE 1-continued

|  | Example | | | | | | | | | | |
|---|---|---|---|---|---|---|---|---|---|---|---|
|  | 1 | 1' | 2 | 3 | 3' | 4 | 5 | 5' | 6 | 7 | 7' |
| MgO (mol %) | 75 | 75 | 60 | 50 | 50 | 50 | 50 | 50 | 40 | 25 | 25 |
| Firing temperature (° C.) | 1600 | 1600 | 1600 | 1600 | 1600 | 1500 | 1400 | 1400 | 1600 | 1600 | 1600 |
| Spinnel amount (wt %) | 78 | 78 | 93 | 100 | 98 | 100 | 100 | 80 | 85 | 58 | 50 |
| Reactivity (dimensional expansion, %) | 0.08 | 0.09 | 0.07 | 0.05 | 0.06 | 0.01 | −0.04 | 0.13 | 0.10 | 0.15 | 0.19 |
| Change of roundness of inner surface (mm) | 0.03 | 0.04 | 0.02 | 0.01 | 0.02 | 0.02 | 0.04 | 0.05 | 0.04 | 0.03 | 0.04 |
| Spalling resistance | ○ | ○ | ○ | ⊙ | ⊙ | ⊙ | ⊙ | ⊙ | ⊙ | ⊙ | ⊙ |

TABLE 2

|  |  | Comparative Examples | | | |
|---|---|---|---|---|---|
|  |  | 1 | 2 | 3 | 4 |
| Raw materials | Alumina |  |  |  | 100 |
| (wt %) | Magnesia | 100 | 30 | 52 |  |
|  | Spinnel |  | 70 | 48 |  |
| Al$_2$O$_3$ (mol %) |  | 0 | 20 | 80 | 100 |
| Mgo (mol %) |  | 100 | 80 | 20 | 0 |
| Firing temperature (° C.) |  | 1600 | 1600 | 1600 | 1600 |
| Spinnel amount (wt %) |  | 0 | 70 | 48 | 0 |
| Reactivity (dimensional expansion, %) |  | 0.10 | 0.10 | 0.34 | 0.90 |
| Change of roundness of inner surface (mm) |  | 0.02 | 0.01 | 0.07 | 0.10 |
| Spalling resistance |  | x | x ~ Δ | ⊙ | ⊙ |

(3) Raw material magnesia

| Electrofused magnesia (passing 0.5 mm sieve) | 60 wt. % |
|---|---|
| Electrofused magnesia (passing #325 sieve) | 40 wt. % |

(4) Raw material mullite

| Sintered mullite (1–0.5 mm) | 30 wt. % |
|---|---|
| Sintered mullite (passing 0.5 mm sieve) | 30 wt. % |
| Clay | 20 wt. % |
| Calcinated alumina | 20 wt. % |

The above-components of each raw material were dry-mixed thoroughly in the above proportions to prepare a powder of each raw material. The individual powders were weighed so as to give a molar ratio shown in Table 3. Thereto was added 0.3% by weight of a PVA as a binder. The mixture was kneaded by the use of a fret mill to prepare a body.

The body was molded, dried and fired in the same manner as in Example 1 to produce a ring-shaped jig sample. The jig sample was measured for reactivity, roundness and spalling resistance. The results are shown in Table 3.

TABLE 3

|  | Examples | | | | | Comparative Examples | | | | |
|---|---|---|---|---|---|---|---|---|---|---|
|  | 8 | 9 | 10 | 11 | 12 | 5 | 6 | 7 | 8 | 9 |
| Al$_2$O$_3$ (mol %) | 25 | 40 | 50 | 60 | 75 | 0 | 20 | 80 | 100 | 65 |
| MgO (mol %) | 75 | 60 | 50 | 40 | 25 | 100 | 80 | 20 | 0 | 0 |
| SiO$_2$ (mol %) |  |  |  |  |  |  |  |  |  | 35 |
| Firing temperature (° C.) | 1600 | 1600 | 1600 | 1600 | 1600 | 1600 | 1600 | 1600 | 1600 | 1400 |
| Reactivity (dimensional expansion, %) | 0.03 | 0.01 | 0.00 | 0.04 | 0.11 | 0.04 | 0.04 | 0.37 | 0.52 | 0.35 |
| Change of roundness of inner surface (mm) | 0.04 | 0.03 | 0.03 | 0.05 | 0.07 | 0.04 | 0.07 | 0.14 | 0.21 | 0.15 |
| Spalling resistance | ○ | ○ | ⊙ | ⊙ | ⊙ | Δ | Δ~○ | ⊙ | Δ | ⊙ |

EXAMPLES 8 to 12 AND COMPARATIVE EXAMPLES 5 to 9

The following raw materials were used.

(1) Raw material alumina

| Electrofused alumina (passing 1 mm sieve) | 30 wt. % |
|---|---|
| Electrofused alumina (passing #325 sieve) | 40 wt. % |
| Calcinated alumina | 30 wt. % |

(2) Raw material spinnel

| Electrofused spinnel (1–0.5 mm) | 30 wt. % |
|---|---|
| Electrofused spinnel (passing 0.5 mm sieve) | 20 wt. % |
| Electrofused spinnel (passing #325 sieve) | 50 wt. % |

EXAMPLES 13 to 25 AND COMPARATIVE EXAMPLES 10 to 11

To one of the mixed powders obtained in Examples 1 to 7 was added RO (either of ZnO, MnO, NiO, CaO, SrO, BaO, PbO and CdO) in the form of oxide, carbonate or sulfate in an amount (in terms of oxide) shown in Table 4 or 5. The mixture was dry-mixed to prepare a body.

The body was molded, dried and fired in the same manner as in Example 1 to produce a ring-shaped jig sample. The jig sample was measured for reactivity, roundness and spalling resistance. Various ferrites fired on the jig sample were measured for three-point bending strength. The results are shown in Tables 4 and 5.

In Tables 4 and 5, ferrites A, B, C and D refer to the following.

A: $Fe_2O_3$ 50 mole %, MnO 30 mole %, ZnO 20 mole % and NiO 3 mole % based on the total of the above three components.

B: $Fe_2O_3$ 50 mole %, MnO 25 mole %, ZnO 25 mole % and CaO 3 mole % based on the total of the above three components.

C: $Fe_2O_3$ 50 mole %, Mno 20 mole %, Zno 30 mole % and SrO 3 mole % based on the total of the above three components.

D: $Fe_2O_3$ 50 mole %, MnO 25 mole %, ZnO 25 mole % and BaO 3 mole % based on the total of the above three components.

As stated above, the jig of the present invention is unreactive to a material (e.g. defection yoke) to be fired, gives rise to no dimensional change of the material, and has striking meritorious effects.

What is claimed is:

1. A jig for use in firing of a ferrite-made member, consisting essentially of 50% or more by weight of $MgO.Al_2O_3$ spinel, wherein the molar ratio of total MgO and total $Al_2O_3$ in the jig is 25:75 to 75:25.

2. A jig according to claim 1, wherein the molar ratio of total MgO and total $Al_2O_3$ in jig is 25:75 to 75:25.

TABLE 4

| | Examples | | | | | | | Comparative Examples | |
|---|---|---|---|---|---|---|---|---|---|
| | 13 | 14 | 15 | 16 | 17 | 18 | 19 | 10 | 11 |
| $Al_2O_3$ (mol %) | 25 | 50 | 50 | 50 | 75 | 50 | 50 | 50 | 50 |
| MgO (mol %) | 75 | 50 | 50 | 50 | 25 | 50 | 50 | 50 | 50 |
| ZnO (mol %) | | | 10 | 5 | 10 | 25 | 10 | 30 | |
| MnO (mol %) | | | 5 | 25 | 30 | | | | |
| Firing temperature (° C.) | 1600 | 1600 | 1600 | 1600 | 1600 | 1600 | 1600 | 1606 | 1600 |
| Reactivity (dimensional expansion, %) | 0.04 | 0.07 | 0.05 | 0.01 | 0.08 | 0.06 | 0.04 | 0.05 | 0.08 |
| Change of roundness of inner surface (mm) | 0.03 | 0.02 | 0.04 | 0.02 | 0.05 | 0.04 | 0.07 | 0.06 | 0.07 |
| Spalling resistance | ○ | ○ | ◎ | ◎ | ◎ | ◎ | ◎ | ○ | ○ |
| Strength of ferrite* | | | | | | | | | |
| Kind of ferrite A | 100 | 104 | 107 | 118 | 99 | 104 | 110 | 102 | 85 |
| B | 102 | 107 | 108 | 120 | 103 | 101 | 104 | 105 | 90 |
| C | 105 | 107 | 110 | 105 | 100 | 105 | 118 | 87 | 104 |
| D | 100 | 102 | 104 | 104 | 100 | 106 | 107 | 100 | 102 |

*Strength of ferrite A, B, C or D was determined according to the test method 5 by taking, as 100, the strength of ferrite A, B, C or D when fired at 1,600° C. on the same $MgO:Al_2O_3$ ratio ring sample as in Example 1.

TABLE 5

| | Examples | | | | | |
|---|---|---|---|---|---|---|
| | 20 | 21 | 22 | 23 | 24 | 25 |
| $Al_2O_3$ (mol %) | 50 | 50 | 50 | 50 | 50 | 50 |
| MgO (mol %) | 50 | 50 | 50 | 50 | 50 | 50 |
| NiO (mol %) | 10 | | | | | |
| CaO (mol %) | | 10 | | | | 5 |
| SrO (mol %) | | | 10 | | | |
| BaO (mol %) | | | | 10 | | |
| PbO (mol %) | | | | | 10 | |
| CdO (mol %) | | | | | | 10 |
| Firing temperature (° C.) | 1600 | 1600 | 1600 | 1600 | 1600 | 1600 |
| Reactivity (dimensional expansion, %) | 0.07 | 0.04 | 0.05 | 0.03 | 0.04 | 0.08 |
| Change of roundness of inner surface (mm) | 0.03 | 0.07 | 0.05 | 0.02 | 0.01 | 0.03 |
| Spalling resistance | ○ | ○ | ◎ | ◎ | ◎ | ◎ |
| Strength of ferrite | | | | | | |
| Kind of ferrite A | 115 | 101 | 99 | 105 | 98 | 100 |
| B | 100 | 119 | 104 | 102 | 104 | 102 |
| C | 107 | 106 | 124 | 98 | 102 | 97 |
| D | 109 | 104 | 106 | 119 | 102 | 98 |

As is clear from the above results, the jig of the present invention containing $MgO.Al_2O_3$ spinnel as the main component is very low in reactivity with ferrite, small in change of roundness, and excellent in spalling resistance. Further, the ferrite fired using the present jig containing RO in a specified amount range had a strength at least equal to that obtained using the jig containing no RO.

3. A jig according to claim 1, wherein the content of $MgO.Al_2O_3$ spinnel is 50% by weight or more.

4. A jig according to claim 1, additionally comprising RO which consists essentially of an oxide selected from the group consisting of ZnO, CuO, MnO, NiO, CaO, SrO, BaO, PbO and CdO, and is present in an amount of 0 to 25 mole % per 100 mole % of the sum of total MgO and total $Al_2O_3$ in the jig.

5. A jig according to claim 2, wherein RO, which is at least one kind of oxide selected from the group consisting of ZnO, CuO, MnO, NiO, CaO, SrO, BaO, PbO and CdO, is contained in an amount of 0 to 25 mole % per 100 mole % of the sum of total MgO and total $Al_2O_3$ in jig.

6. A jig according to claim 3, wherein RO, which is at least one kind of oxide selected from the group consisting of ZnO, CuO, MnO, NiO, CaO, SrO, BaO, PbO and CdO, is contained in an amount of 0 to 25 mole % per 100 mole % of the sum of total MgO and total $Al_2O_3$ in jig.

7. A jig according to claim 1, wherein the ferrite-made member is a deflection yoke.

8. A jig according to claim 1, wherein the content of $MgO.Al_2O_3$ is 75% or more by weight.

9. A jig for use in firing of a ferrite-made member, consisting essentially of 50% by weight or more of $MgO.Al_2O_3$ spinel, wherein the molar ratio of total MgO and total $Al_2O_3$ in the jig comprises 25:75 to 75:25, and wherein the jig is non-reactive to and does not deform a ferrite-made member fired therein.

* * * * *